United States Patent [19]

Mohney

[11] Patent Number: 4,824,630
[45] Date of Patent: Apr. 25, 1989

[54] METHOD AND APPARATUS FOR APPLYING LABELS IN THE MOLDS OF A PLASTIC BLOW MOLDING MACHINE

[75] Inventor: Gerald L. Mohney, Maumee, Ohio
[73] Assignee: Owens-Illinois Plastic Products Inc., Toledo, Ohio
[21] Appl. No.: 160,561
[22] Filed: Feb. 25, 1988
[51] Int. Cl.⁴ .................... B29C 49/24; B29C 49/20
[52] U.S. Cl. ................................. 264/509; 425/117; 425/126.1; 425/127; 425/503; 425/504; 425/522; 425/538
[58] Field of Search ............... 264/509; 425/116, 117, 425/126.1, 522, 523, 538, 503, 504, 127

[56] References Cited
U.S. PATENT DOCUMENTS

| | | | |
|---|---|---|---|
| 3,267,186 | 8/1966 | Battenfeld | 264/509 |
| 3,324,508 | 6/1967 | Dickinson | 425/522 |
| 3,657,405 | 4/1972 | Langecker | 264/509 |
| 4,335,635 | 6/1982 | Hautemont | 425/126.1 |
| 4,397,625 | 8/1983 | Hellmer et al. | 425/522 |

Primary Examiner—Willard Hoag

[57] ABSTRACT

A method and apparatus for applying labels in the molds of a plastic blow molding machine of the type wherein a plurality of sets of molds are mounted on a wheel rotatable about a horizontal axis and the molds are moved toward and away from one another to enclose a parison and the parison is then blown to the confines of the cavity between the mold sections which comprises successively die punching labels from a web directly onto vacuum cups and delivering the labels successively between the mold sections by moving the vacuum cups between the mold sections and thereafter moving the cups laterally into the cavities of the mold sections.

7 Claims, 5 Drawing Sheets

METHOD AND APPARATUS FOR APPLYING LABELS IN THE MOLDS OF A PLASTIC BLOW MOLDING MACHINE

This invention relates to plastic blow molding machines and particularly to machines for delivering labels to an open mold so that they can be adhered to the plastic article when the mold is closed about a parison and the parison is blown to the confines of the mold.

BACKGROUND AND SUMMARY OF THE INVENTION

It is common to make hollow plastic articles such as containers by closing a mold about a heated parison and blowing the parison outwardly against the confines of the mold to form the hollow article. More recently, it has been suggested that labels can be delivered to an open mold and deposited in the cavity of the mold so that when the mold is closed and the parison is blown, the labels become adhered to and become a part of the blown hollow article.

In certain types of machines, the space for delivery of the label into the open mold is limited because of the construction of the machine. More specifically, in one type of blow molding apparatus, a plurality of sets of molds are mounted on a wheel rotatable about a horizontal axis and the molds are moved toward and away from one another to enclose a parison and the parison is then blown by application of air to the confines of the cavity between the mold sections as the wheel rotates. In such an arrangement, the space is extremely limited and the problem of placement of labels in the open mold is difficult. The blown articles are usually taken out of the blow molding apparatus adjacent the twelve o'clock position and the extruded parison is introduced at the three o'clock position such that the area during which the molds are open therebetween is limited. Where two labels are to be delivered for placement on opposite sides of the hollow article, the problem is more difficult. The problem is further complicated when the molds have plural cavities and labels are to be delivered simultaneously to the plural cavities.

In U.S. Pat. No. 4,680,000, there is disclosed and claimed a method and apparatus for applying labels in the molds of a plastic blow molding machine comprises removable labels successively from one or more magazines, depositing the labels on an endless conveyor which transports the labels to a position adjacent an open mold and laterally transferring the labels from the conveyor to a position within the molds such that when the mold closes about a plastic parison and the parison is blown, the labels become adhered to the blown plastic bottle. Such an arrangement necessitates the use of an endless conveyor interposed between the magazine and the mold sections. Accordingly, the labels must be first formed then handled and delivered into the magazine, rmmoved from the magazine positioned properly on the endless conveyor and then removed from the endless conveyor and delivered to the mold sections. These actions contribute to the possibility of loosing control of the position of the labels thereby being misaligned on the blown container especially where the labels are thin and made of plastic.

U.S. Pat. No. 4,397,625 shows a labeler utilized with a rotating blow molding machine which has pick up heads that remove labels from magazines and deliver them to the mold cavities. This arrangement also has the disadvantages of the need for placement of the labels in magazines and removal therefrom.

Accordingly, among the objectives of the present invention are to provide a method and apparatus for delivering labels between the sections of an open mold of a wheel or rotary type blow molding machine which obviates the need for magazines and conveyors thereby minimizing the likelihood of misalignment of the label; which will accommodate various size labels; and which will deliver labels to both sides of the cavity if desired.

In accordance with the invention the method and apparatus for applying labels in the molds of a plastic blow molding machine of the type wherein a plurality of sets of molds are mounted on a wheel rotatable about a horizontal axis and the molds are moved toward and away from one another to enclose a parison and the parison is then blown to the confines of the cavity between the mold sections which comprises successively die punching labels from a web onto vacuum cups and delivering the labels successively between the mold sections by moving the vacuum cups between the mold sections and thereafter moving the cups laterally into the cavities of the mold sections.

DESCRIPTION

Figure 1:
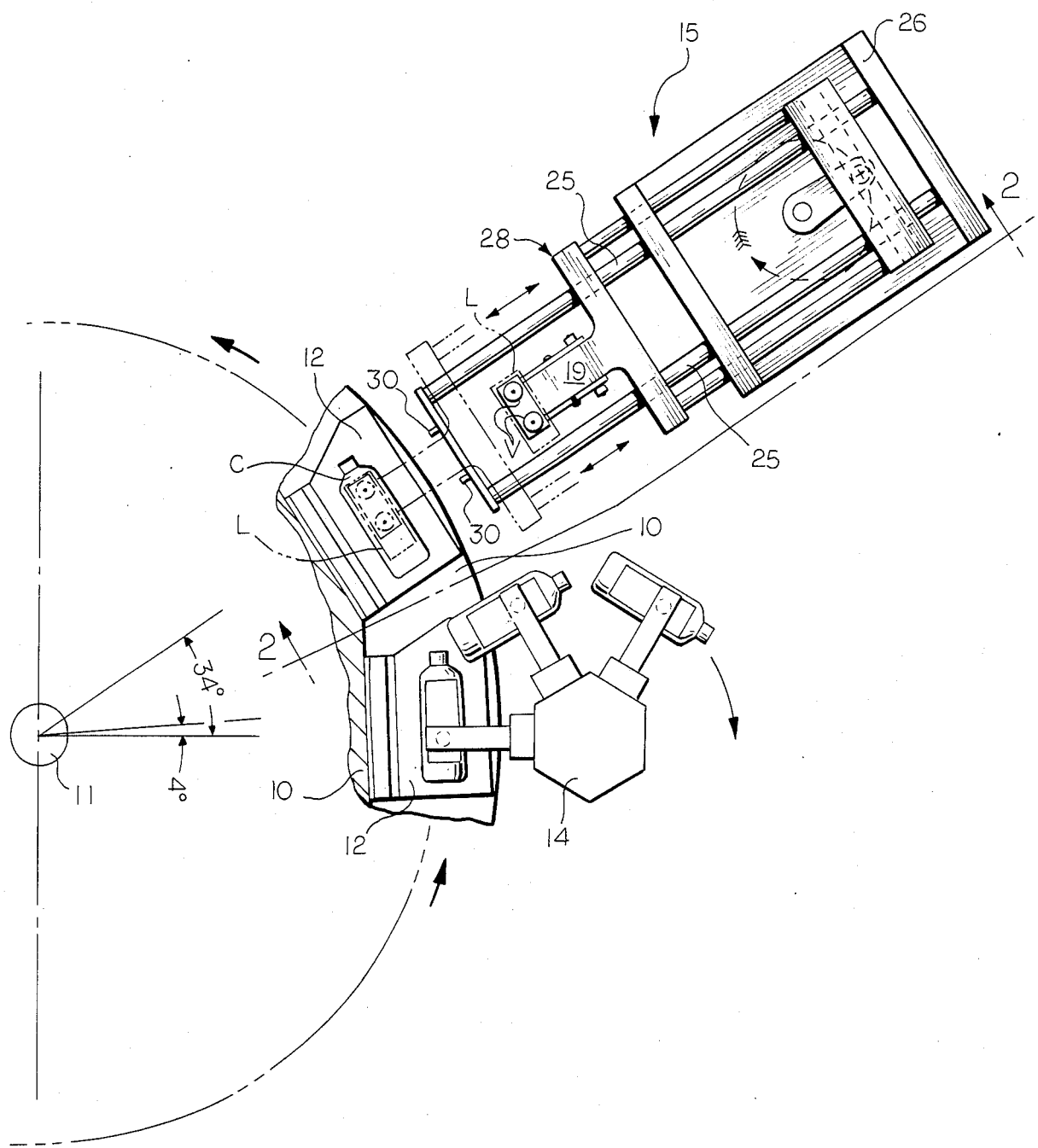
FIG. 1 is a partly schematic fragmentary elevational view of an apparatus embodying the invention.

Referring to FIG. 1, the invention is particularly applicable to a blow molding apparatus comprising a wheel plate 10 whch is mounted on a shaft 11 extending horizontally for rotation on a frame and a plurality of sets of molds are provided in circumferentially spaced relation about the wheel plate 10, each set comprising a pair of mold sections 12, 13, a second mold section 14 being mounted on the wheel plate 10 movable toward and away from one another to close and open the mold. As the wheel rotates, where the molds are open, an extruder (not shown) delivers a parison between an open mold so that when the mold is closed, the parison can be blown to form the hollow article such as a container. At another position, the hollow articles are removed by a take out mechanism 14. The blow molding apparatus may be of the type shown in U.S. Pat. Nos. 4,523,904, 4,523,904 or 4,397,625, which are incorporated herein by reference.

In accordance with the invention, the label applying mechanism 15 is constructed and arranged to simultaneously die cut labels L from a web W onto vacuum cups V and deliver them to the open mold sections 12, 14 which are moved axially, as shown toward and away from one another to close or open. The mold sections 12, 14 can be also positioned on the wheel plate 10 for movement radially relative to one another.

Figure 2:
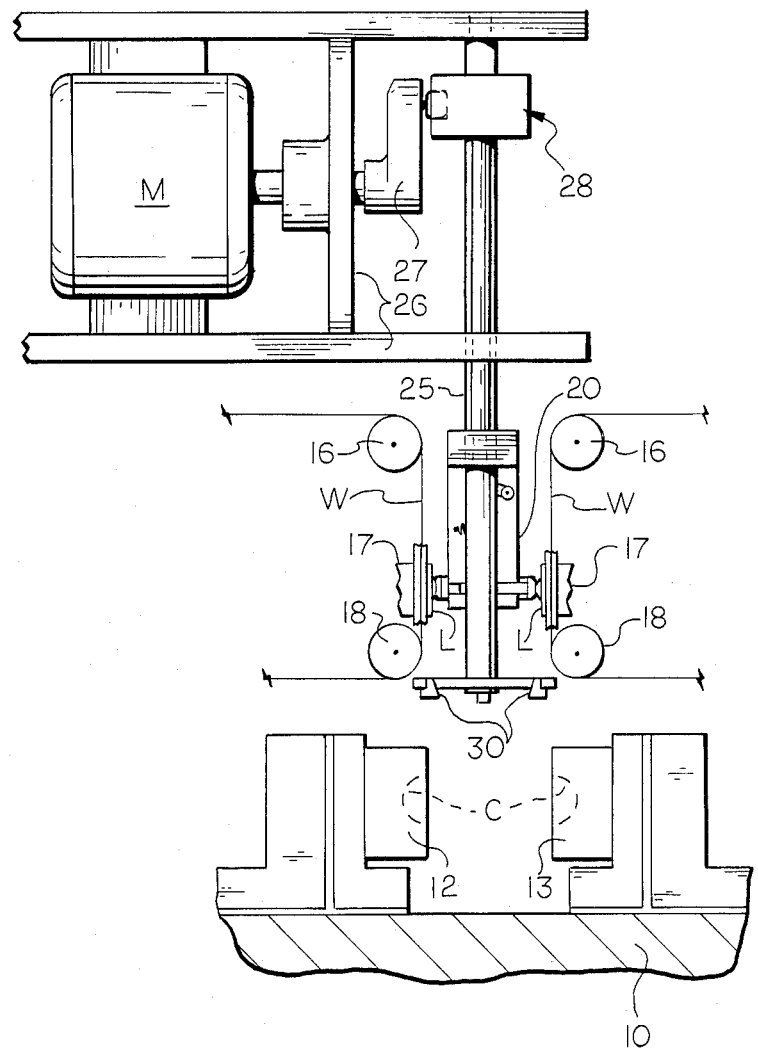
FIG. 2 is a fragmentary partly schematic view taken along line 2—2 in FIG. 1.
Figure 3:
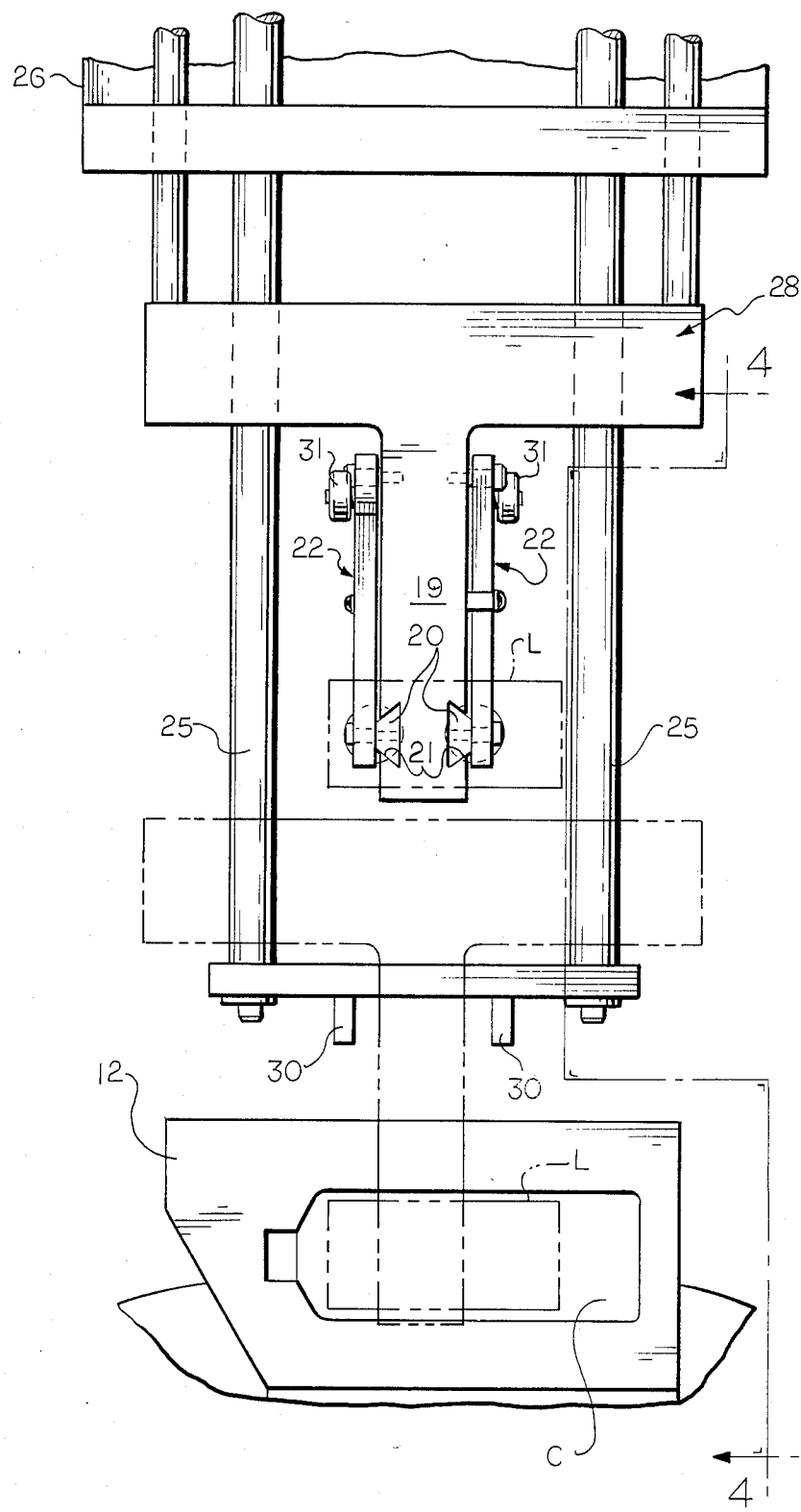
FIG. 3 is a fragmentary elevational view similar to FIG. 1 on an enlarged scale.

More specifically, the web from a roll is fed about rollers 16 past a die punch 17 and the remaining portion of the web is fed over a roller 18. Each vacuum cup V is mounted on a movable head 19 for transverse movement on a cross slide 20 in a groove 21. The position of the cross slide 21 is controlled by an L-shaped lever 22 having a long arm 23 and a short arm 24. The head 19 forms a pair of slides 28 movable on slide bars 25 on a frame 26. The head 19 is movable toward and away from the molds by a crank 27 on frame 26 that is connected to the slide 28 on the slide bars 25 (FIGS. 1, 2) and is driven by a motor M.

A tension spring 29 is associated with each lever 22 and has one end fixed to the head 19 and the other end fixed to the long arm 23 of lever 22 to urge the respective vacuum cross slide 20 inwardly relative to the head 19.

Figure 4:
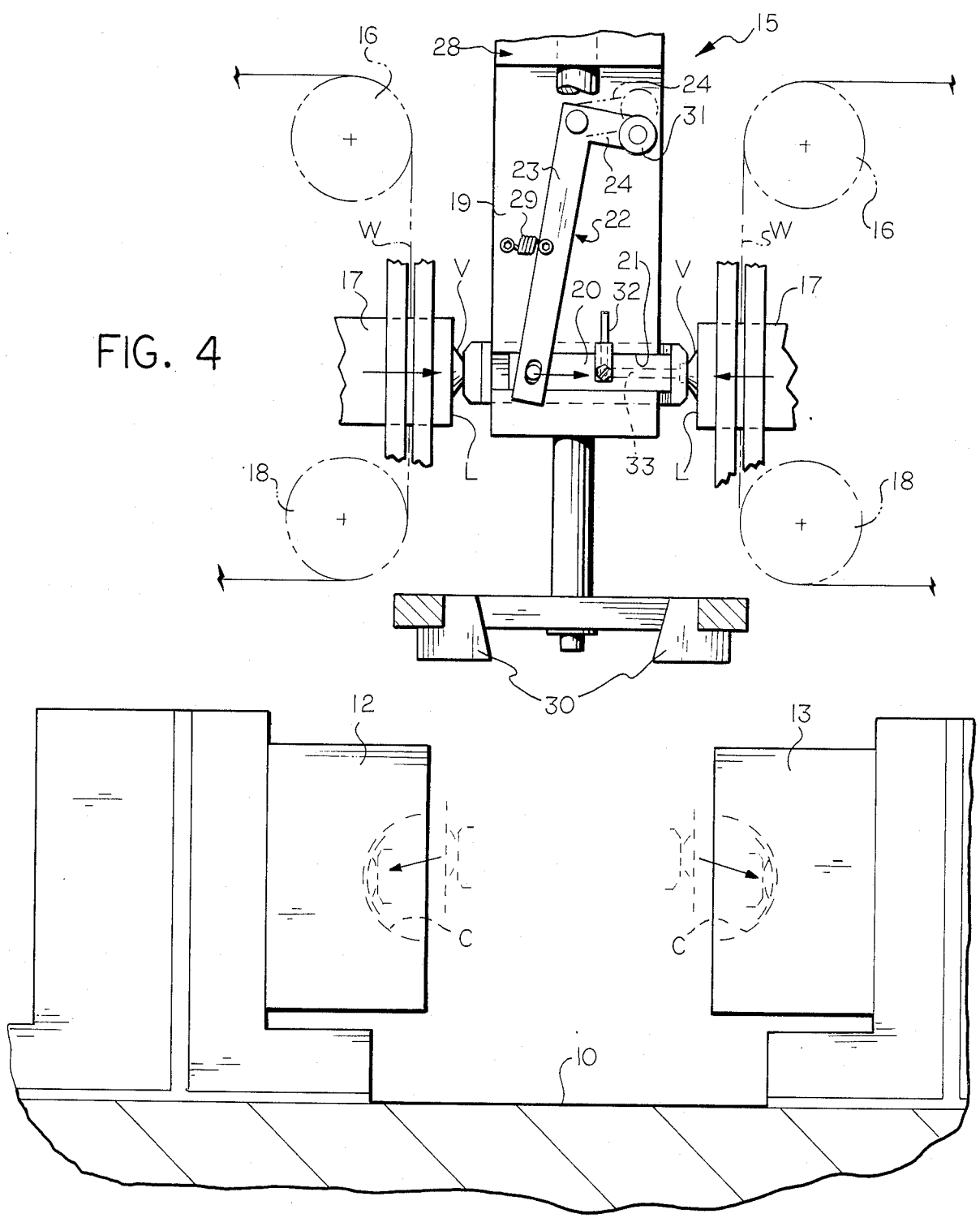
FIG. 4 is a fragmentary sectional view taken along line 4—4 in FIG. 3.
Figure 5:
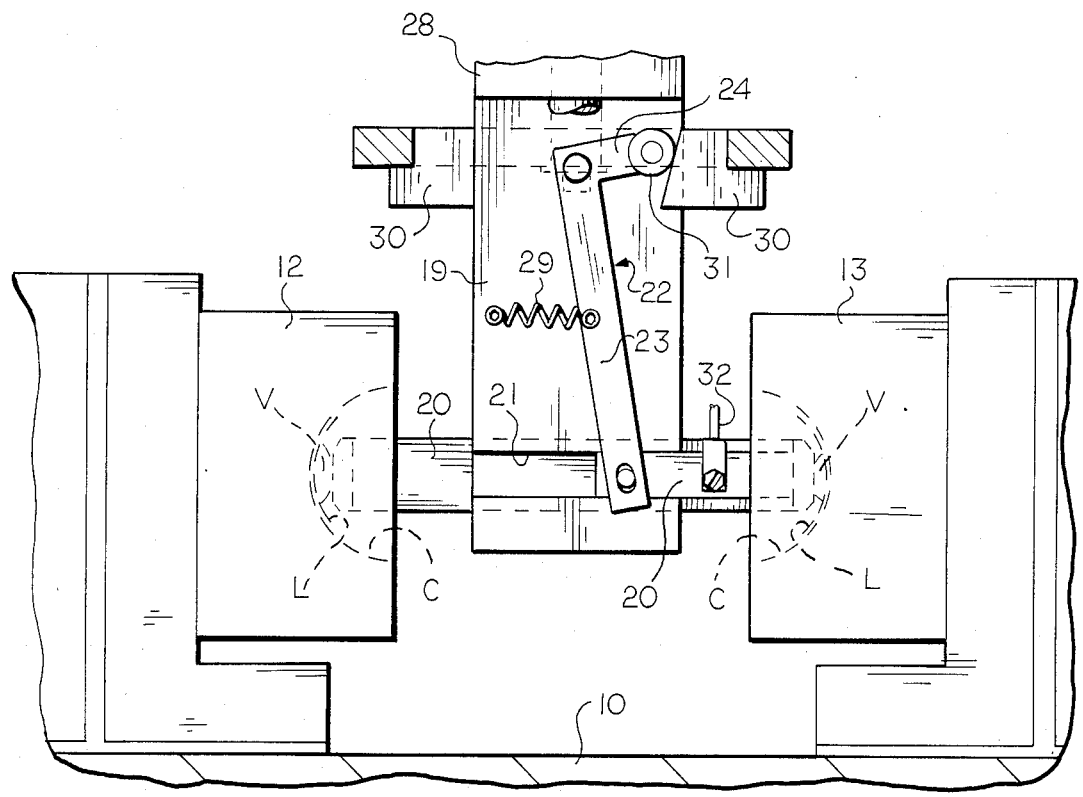
FIG. 5 is a fragmentary view similar to FIG. 4 showing parts in a different operative position.

Referring to FIG. 4, when the head is in position adjacent the die punches 17, the cross slides 20 and vacuum cups are held adjacent the punches 17 so that when the punches are actuated a label L is cut and delivered to each set of vacuum cups V. When the mold sections are in the open position, the head 19 is moved to the position shown in FIG. 5. As the head 19 moves adjacent fixed cams 30 (FIG. 4), the cams 30 engage a roller 31 on the short arm 24 of lever 22 and moves the cross slides 20 and, in turn, the vacuum cups V supporting the labels L into the cavities C of the respective mold sections thereby delivering the labels to the cavities.

Each cross slide 20 is provided with a vacuum inlet 32 and vacuum passage 33 delivering vacuums to the respective vacuum cups V.

It can be appreciated that if only one label L is to be used, the apparatus can be modified by eliminating one set of lever 22, cross slide 20 and associated vacuum cups V.

It can thus be seen that there has been provided a method and apparatus for delivering labels between the mold sections of a rotary blowing machine in order to provide labels on the hollow containers that are formed which accurately delivers labels to the cavities without need for the label magazines and endless conveyors.

I claim:

1. In a method of operating a blow molding apparatus having a plurality of sets of molds on a wheel rotatable about a horizontal axis wherein the mold sections are moved toward and away from one another to enclose a parison and the parison is then blown to the confines of the cavity between the mold sections a the wheel rotates, the improvement for delivering labels to the cavities of the open mold sections which comprises moving a web of label material past a die punch station,
   punching labels successively from said web by a punch and delivering them directly to vacuum devices by said punch, and
   moving the vacuum devices into the open mold sections and transversely relative to the mold sections to deliver the labels to the open mold sections.

2. The method set forth in claim 1 the improvement further including
   moving a second web of label material past a second die punch station,
   punching labels successively from said web by a second punch and delivering them directly to vacuum devices by said second punch, and
   moving the vacuum devices into the open mold sections and transversely relative to the mold sections to deliver the labels to the open mold sections.

3. A blow molding apparatus having a plurality of sets of molds on a wheel rotatable about a horizontal axis wherein the mold sections are moved toward and away from one another to enclose a parison and the parison is then blown to the confines of the cavity between the mold sections a the wheel rotates, and in-mold labeling apparatus, comprising
   a die punch at a die punch station,
   means for moving a web of label material past said die punch station,
   a head supporting plural vacuum cups,
   means for supporting said head for movement between the die cut station wherein the die punch is movable to deliver labels successively to the vacuum cups on the head
   and a position between open mold sections, and
   means on the head for moving the vacuum cup means toward and away from the cavities for delivering the labels on the vacuum devices to the cavities of the mold section.

4. The apparatus set forth in claim 3 wherein said means for supporting said head comprises
   a frame supporting said head for movement in a straight line between said die punch station and said position adjacent said open mold sections,
   said vacuum devices being supported on a cross slide,
   means connected to said cross slide and operable by fixed cam means in the path of the head to move the cross slide and the associated vacuum devices transversely of said mold sections and into the cavities of the mold sections.

5. The apparatus set forth in claim 4 wherein said means for moving said cross slide comprises
   an L-shaped lever having one arm pivoted to said cross slide, the other arm adapted to be engaged by said cam.

6. The apparatus set forth in claim 5 including means for yieldingly urging said cross slide to a retracted position.

7. The apparatus set forth in claim 6 wherein said means for moving said head comprises
   a crank,
   a motor for moving said crank in orbital fashion, and
   means for connecting said crank to said head.

* * * * *